US009056036B2

(12) United States Patent
Nyitray (10) Patent No.: US 9,056,036 B2
(45) Date of Patent: Jun. 16, 2015

(54) MULTIPURPOSE VEHICLE

(71) Applicant: Michael Nyitray, Parkland, FL (US)

(72) Inventor: Michael Nyitray, Parkland, FL (US)

(73) Assignee: Michael Nyitray, Parkland, FL (US)

( * ) Notice: Subject to any disclaimer, the term of this patent is extended or adjusted under 35 U.S.C. 154(b) by 166 days.

(21) Appl. No.: 13/650,566

(22) Filed: Oct. 12, 2012

(65) Prior Publication Data

US 2014/0102816 A1  Apr. 17, 2014

(51) Int. Cl.
*A61G 5/00* (2006.01)
*A61G 5/04* (2013.01)
*F16M 11/20* (2006.01)
*A61G 5/10* (2006.01)
*A63D 5/00* (2006.01)
*A61G 5/12* (2006.01)

(52) U.S. Cl.
CPC .......... *A61G 5/04* (2013.01); *A61G 2005/1091* (2013.01); *A63D 5/00* (2013.01); *A61G 5/10* (2013.01); *F16M 11/20* (2013.01); *A61G 2005/127* (2013.01); *A61G 2005/128* (2013.01); *A61G 2203/70* (2013.01)

(58) Field of Classification Search
CPC .................... B60Y 2200/84; A61G 5/00–5/14
USPC ............. 280/642, 647, 650, 657, 47.38, 47.4, 280/250.1
See application file for complete search history.

(56) References Cited

U.S. PATENT DOCUMENTS

| | | | | |
|---|---|---|---|---|
| 2,544,831 A * | 3/1951 | Guyton | .......................... | 180/6.62 |
| 2,749,997 A * | 6/1956 | Deslippe | ...................... | 180/208 |
| 3,455,404 A * | 7/1969 | Hansen | ......................... | 180/209 |
| 4,065,145 A * | 12/1977 | Chambers | ................ | 280/87.021 |
| 4,368,898 A * | 1/1983 | Lay | ............................. | 280/304.1 |
| 4,403,673 A | 9/1983 | Ball | | |
| 4,457,528 A | 7/1984 | Ichikawa et al. | | |
| 4,470,598 A * | 9/1984 | Steele et al. | .................... | 473/56 |

(Continued)

FOREIGN PATENT DOCUMENTS

EP  0136763 A2  4/1985
EP  1166741 A1  1/2002

(Continued)

OTHER PUBLICATIONS

"Lawn Bowling Wheelchair," May 24, 2012, p. 1. http://btckstorage.blob.core.windows.net/site1193/Special%20Needs/wheelchair.jpg.

(Continued)

*Primary Examiner* — J. Allen Shriver, II
*Assistant Examiner* — Emma K Frick
(74) *Attorney, Agent, or Firm* — Seager, Tufte & Wickhem LLC (57) ABSTRACT

A motorized vehicle assembly having a frame, a seat supported by the frame, and one or more wheels in communication with the frame, where the frame may have a central plane extending therethrough. The motorized vehicle assembly may include a first wheel and a second wheel in communication with the frame and configured to rotate about a wheel axis, where the first wheel and the second wheel may be positioned asymmetrically with respect to the central plane of the frame. A weight may be supported by the frame and the weight may be positioned at least partially offset toward a second side of the central plane of the frame. The seat may include a cut-in portion supported by a first side of the central plane of the frame. The motorized vehicle assembly may be a powered wheelchair.

15 Claims, 7 Drawing Sheets

(56) References Cited

U.S. PATENT DOCUMENTS

| | | | |
|---|---|---|---|
| 4,647,053 A * | 3/1987 | Kanno | 280/6.154 |
| 5,437,497 A * | 8/1995 | Hutson | 297/338 |
| 5,439,240 A | 8/1995 | Tichenor et al. | |
| 5,884,929 A | 3/1999 | Kincaid | |
| 6,004,233 A | 12/1999 | Raubuck et al. | |
| 6,024,369 A | 2/2000 | Goldstein et al. | |
| 6,154,690 A | 11/2000 | Coleman | |
| 6,510,567 B1 | 1/2003 | Robbins | |
| 6,578,854 B2 | 6/2003 | Wucherpfennig et al. | |
| 6,848,696 B2 * | 2/2005 | Miller | 280/87.021 |
| 6,976,699 B2 | 12/2005 | Koerlin | |
| 7,083,019 B2 | 8/2006 | Chiou et al. | |
| 7,104,346 B2 | 9/2006 | Schaffner | |
| 7,487,559 B1 * | 2/2009 | Denosky | 5/81.1 HS |
| 7,798,546 B2 | 9/2010 | Kniss | |
| 7,857,324 B2 * | 12/2010 | Yun | 280/5.52 |
| 7,988,163 B2 * | 8/2011 | Accetta | 280/87.05 |
| 7,997,597 B2 * | 8/2011 | Mehl | 280/87.021 |
| 8,348,288 B1 * | 1/2013 | Laughon, Sr. | 280/87.021 |
| 8,544,866 B2 * | 10/2013 | Noonan et al. | 280/304.1 |
| 8,565,982 B2 * | 10/2013 | Lofstrand | 701/49 |
| 8,684,398 B1 * | 4/2014 | Nyitray | 280/657 |
| 2002/0024196 A1 * | 2/2002 | Malassigne et al. | 280/648 |
| 2008/0111388 A1 | 5/2008 | Kniss | |
| 2011/0276233 A1 * | 11/2011 | Lofstrand | 701/49 |
| 2012/0169025 A1 * | 7/2012 | Golden, Jr. | 280/250.1 |
| 2012/0261955 A1 | 10/2012 | Iida et al. | |
| 2013/0020850 A1 | 1/2013 | Lucas | |

FOREIGN PATENT DOCUMENTS

| | | |
|---|---|---|
| WO | 2008128950 A2 | 10/2008 |
| WO | 2010056193 A1 | 5/2010 |
| WO | 2011100556 A2 | 8/2011 |

OTHER PUBLICATIONS

Turner, "Skycare Chair," Yanko Design, Jan. 23, 2012, p. 2-4. http://www.yankodesign.com/2012/01/23/wheelchair-for-air-travel/.

\* cited by examiner

MULTIPURPOSE VEHICLE

TECHNICAL FIELD

The disclosure is directed to vehicles, such as wheelchairs. More particularly, the disclosure is directed to wheelchairs and wheelchair frames thereof configured to be used in one or more activities in which a user is participating.

BACKGROUND

Conventional vehicles (e.g., mobility vehicles), such as wheelchairs having and a symmetrical H-frame structure, may be manually operated and/or may be powered by a motor. Illustratively, manual and powered or motorized wheelchairs typically include a frame, a seat supported by the frame and a plurality of wheels in communication with the frame. Typically, a powered or motorized wheelchair may include a motor supported by a structure of the frame, where the motor may be in communication with one or more wheels connected to the frame. Typical powered or motorized vehicles include a power source. For example, typical power sources may include a battery located within the frame.

SUMMARY

This disclosure is directed to several alternative or complementary designs of, materials of, and methods of using mobility vehicles, such as wheelchairs. Although it is noted that wheelchairs exist, there exists need for improvement on those devices.

Accordingly, one illustrative embodiment of the disclosure may include a mobility vehicle assembly having a frame, a seat supported by the frame, a first wheel, and a second wheel. The mobility vehicle, in some cases, may be a motorized vehicle, such as a motorized wheelchair. In some cases, the first wheel and the second wheel of the mobility vehicle may be in communication with the frame and may be configured to rotate relative to the frame. Illustratively, when rotating relative to the frame, the first wheel and the second wheel may be configured to rotate about a wheel axis.

In some cases, the first wheel and the second wheel may be asymmetrically positioned with respect to the frame. For example, the frame may have a central plane extending therethrough, and the first wheel and the second wheel may be asymmetrically positioned with respect to the central plane of the frame. Alternatively, or in addition, one of the wheels may be offset from the frame and another of the wheels may be inset with respect to the frame.

In some cases, the motorized vehicle may include a motor and/or a power source (e.g., a battery). The motor and/or the power source of the motorized vehicle may be offset and positioned to a first side of the central plane of the frame. Illustratively, the motor and/or power source offset from the central plane of the frame may act as a ballast and facilitate maintaining a center of gravity of the motorized vehicle between the first wheel and the second wheel.

In operation, the motorized vehicle may be used in any of one or more activities. For example, the motorized vehicle may be used in activities where a user may participate in the activities by swinging or moving one arm or by leaning to a side. Such activities may include, but are not limited to, bowling, fencing, horse shoes, lawn bowling, track and field events, bocce ball, tennis, basketball, softball, gardening, etc.

The above summary of some example aspects is not intended to describe each disclosed embodiment or every implementation of the claimed disclosure.

BRIEF DESCRIPTION OF THE DRAWINGS

The disclosure may be more completely understood in consideration of the following detailed description of various embodiments in connection with the accompanying drawings, in which.

While the disclosure is amenable to various modifications and alternative forms, specifics thereof have been shown by way of example in the drawings and will be described in detail. It should be understood, however, that the intention is not to limit aspects of the claimed disclosure to the particular embodiments described. On the contrary, the intention is to cover all modifications, equivalents, and alternatives falling within the spirit and scope of the claimed disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the claimed disclosure. The illustrative embodiments depicted are intended only as exemplary. Selected features of any illustrative embodiment may be incorporated into an additional embodiment unless clearly stated to the contrary. Further, any numbers used to describe like features (e.g., a first wheel and a second wheel) are used for clarity of descriptiveness purposes and are not meant to limit the interpretation or scope of such features.

Generally, as described herein, a mobility vehicle assembly may be a wheelchair 10. The wheelchair 10 may be manually operated or may be a powered wheelchair 10. In some instances, the wheelchair 10 may include a frame 12, one or more seats 14, and one or more similar or dissimilar wheels 16 (e.g., a first wheel 16a, a second wheel 16b, a third wheel 16c, a fourth wheel 16d, etc.), where at least one wheel 16 may be configured to be out of the way of a user when the user swings its arm. The frame 12 may be configured to be in communication with the one or more seats 14 (e.g., the frame 12 may be configured to support the seat(s) 14) and the one or more wheels 16 may be configured to communicate with the frame 12.

The wheels 16 may have any shape and/or dimension as desired. The shorter the wheels 16, the nearer the center of gravity of the wheelchair 10 is to a floor or ground and thus, the more stable the wheelchair 10. Further, the wheels 16 may have any thickness, width, and/or density, as desired. For example, high pressure wheels 16 or solid rubber wheels may be used and may reduce centrifugal bouncing when a user of the wheelchair 10 is participating in activities.

The wheelchair 10 may have any size and/or dimension. For example, the distance from the seat 14 to a floor or ground may be at least eighteen inches. Similarly, other features of the wheelchair 10 may take on any typical or atypical sizes or dimensions of wheelchairs 10, as desired.

Figure 1:
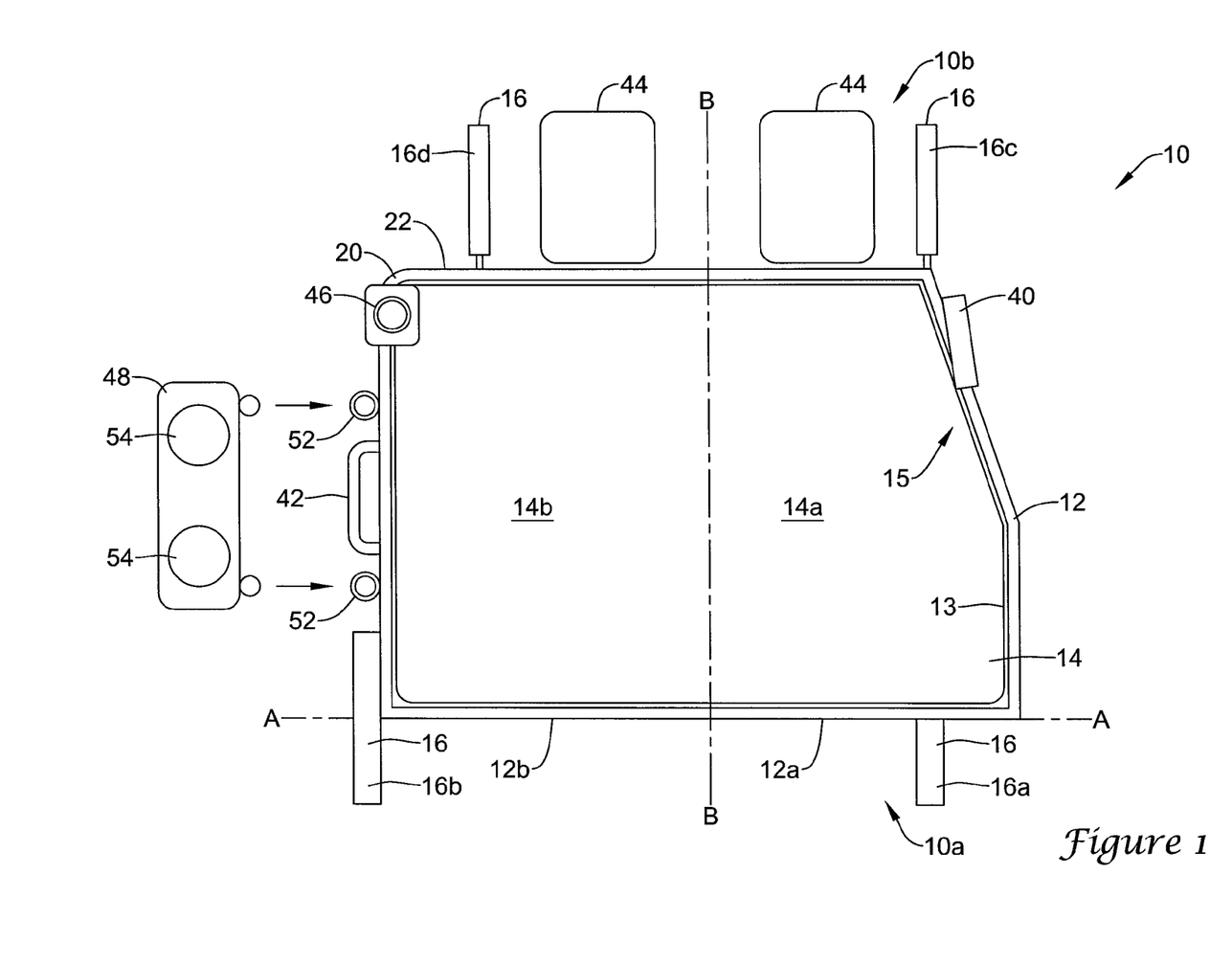
FIG. 1 is a schematic and partially exploded view from above of an illustrative powered wheelchair structure.
Figure 2:
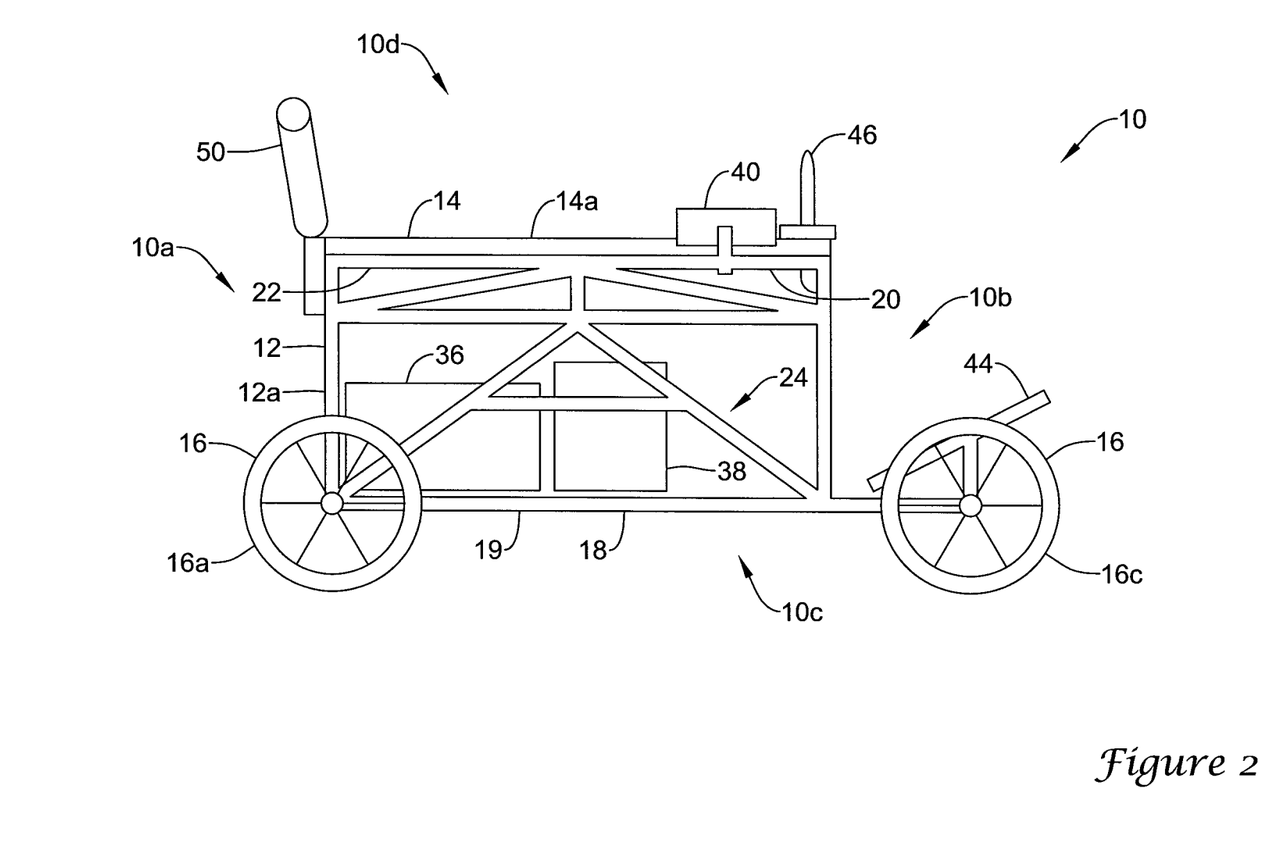
FIG. 2 is a schematic view from a first side of an illustrative powered wheelchair structure.

In some instances, a pair or more of the one or more wheels 16 (e.g., the first wheel 16a and the second wheel 16b) may be configured to rotate about a wheel axis A-A of wheelchair 10. For example, the first wheel 16a may be configured to rotate relative to the frame 12 and about the wheel axis A-A, and the second wheel 16b may be configured to rotate relative to the frame 12 and about the wheel axis A-A, as shown in FIGS. 3-6, where one or more wheel axles may extend through axis A-A. In some cases, the pair of wheels 16 configured to rotate about the wheel axis A-A may be positioned or located toward a rear portion of the wheelchair 10 (as shown in FIG. 1) or a front portion of the wheelchair 10.

In addition to, or in alternative to, the pair of the one or more wheels 16 configured to rotate about the wheel axis A-A, the wheelchair 10 may include one or more other wheels 16 (e.g., the third wheel 16c and the fourth wheel 16d). The one or more other wheels 16 may be in communication with the frame 12 and may be configured to rotate about a wheel axis other than wheel axis A-A. Alternatively, or in addition, the one or more other wheels 16 may be caster wheels or other wheel types that are configured to rotate and/or swivel about their own axes. In some cases, the one or more other wheels 16 may be positioned toward or located at a front portion of wheelchair 10 (as shown in FIG. 1) or a rear portion of wheelchair 10.

The frame 12 may be configured to have a central plane B-B extending therethrough, as shown in FIGS. 3-6. In some instances, the central plane B-B extending through the frame 12 may extend through the frame 12 at a position substantially equidistant from the widest portion of a first side 12a of the frame 12 and a second side 12b of the frame 12. Illustratively, the central plane B-B may form a plane extending from a bottom 10c of the wheelchair 10 to a top 10d of the wheelchair 10 and from the rear 10a of the wheelchair 10 to a front 10b of the wheelchair 10, as shown in FIGS. 1 and 3-6. For example, the central plane B-B may be defined by the central axis extending through the frame 12 and a central axis extending through the seat 14, such that the central plane B-B defines the first side 12a of the frame 12 and the second side 12b of the frame 12.

In some instances, the first wheel 16a and the second wheel 16b may be positioned asymmetrically with respect to the central plane B-B of the frame 12. To facilitate the asymmetric positioning of the first wheel 16a and the second wheel 16b, the frame 12 (e.g., the outer boundaries of the frame 12) may be configured to be asymmetrical with respect to the central plane B-B. For example, the frame 12 may have a wheel support 18 and a seat support 20, where at least a portion of the wheel support 18 may have a width distance W1 and at least a portion of the seat support 20 may have a width distance W2 that may be greater than width distance W1 of the wheel support 18, as shown in FIGS. 3-6. In some illustrative instances, a distance from the central plane B-B to the outer edge of the wheel support 18 at the first side 12a of the frame 12 adjacent the first wheel 16a may be a distance W1' and a distance from the central plane B-B to the outer edge of the wheel support 18 at the second side 12b of the frame 12 adjacent the second wheel 16b may be a distance W1", where distance W1" may be greater than distance W1'. The distances of the widths discussed herein may have any size and/or dimension as long as those sizes and/or dimensions are consistent with the relative sizes and/or dimensions discussed herein.

The seat support 20 may form the seat 14 and/or support the seat 14 and may have a footprint at least partially defined by a perimeter 22 of the seat support 20. Illustratively, the footprint of the seat support 20 may have a perimeter at least partially defined by the perimeter 22 of the seat support 20 and may include the shadow cast by the perimeter 22 of the seat support 20, where the shadow may extend substantially downward from the top 10d of the wheelchair 10 toward the bottom 10c of the wheelchair 10. In some instances, when the first wheel 16a and the second wheel 16b are positioned asymmetrically with respect to the central axis B-B of the frame 12, the first wheel 16a may be positioned interior or recessed from the footprint of the perimeter 22 of the seat support 20 and/or the seat 14 and the second wheel 16b may be positioned exterior the footprint of the perimeter 22 of the seat support 20 and/or the seat 14.

As discussed, the frame 12 may include the wheel support 18 and the seat support 20. The wheel support 18 may have a perimeter 19 and the seat support 20 may have a perimeter 22. In some instances, the frame 12 may further include one more frame supports 24 (e.g., sets of struts, etc.) and at least one of the one or frame supports 24 (e.g., a first frame support 26, a second frame support 28, etc.) may extend substantially from the wheel support 18 to the seat support 20. Illustratively, as shown in FIGS. 3-6, the first frame support 26 may abut, engage, and/or interact with the second frame support 28. Alternatively, or in addition, the first frame support 26 may be separate from the second frame support 28.

Figure 3:
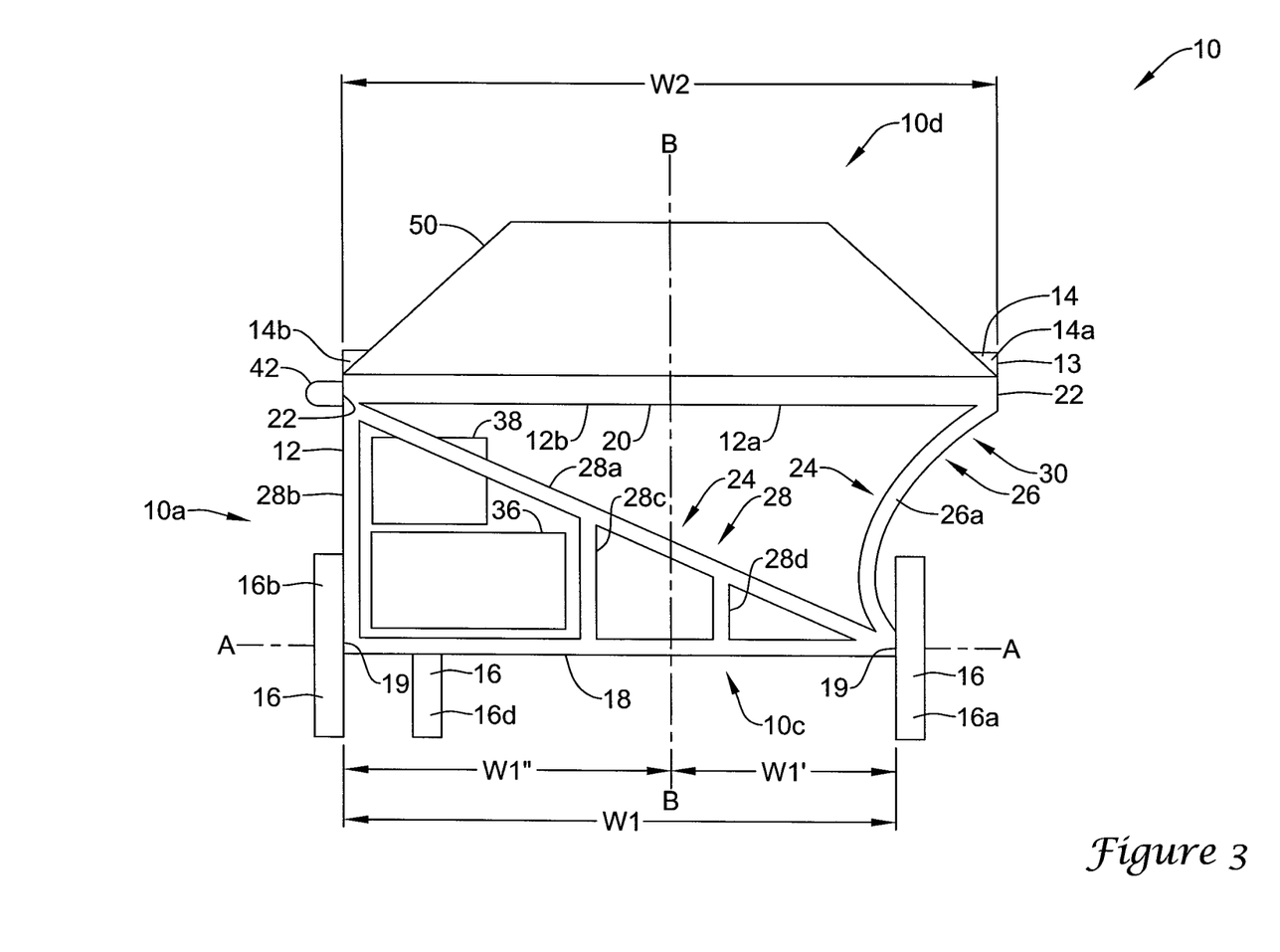
FIG. 3 is a schematic view from a rear side of an illustrative powered wheelchair structure.
Figure 4:
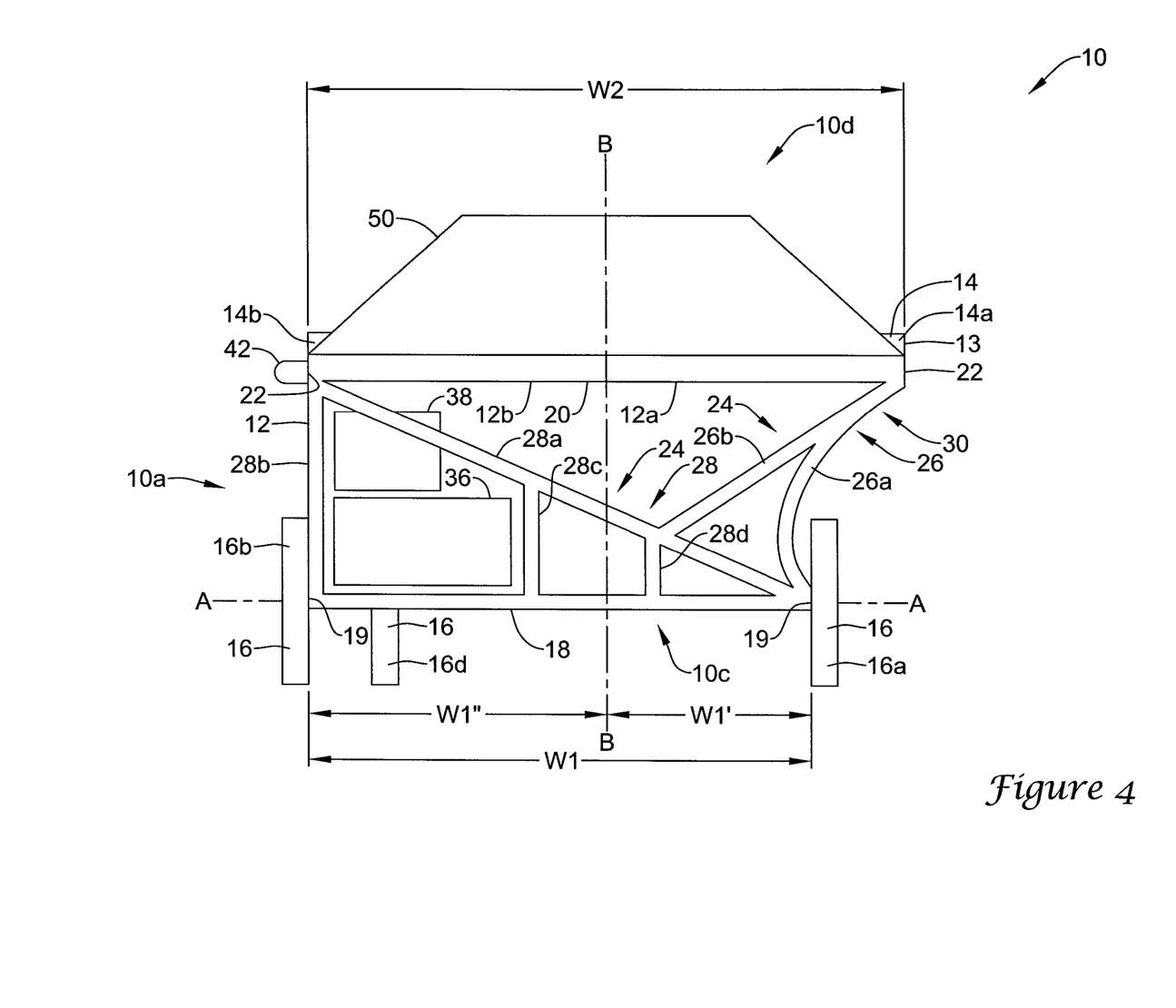
FIG. 4 is a schematic view from the rear side of an illustrate powered wheelchair structure.
Figure 5:
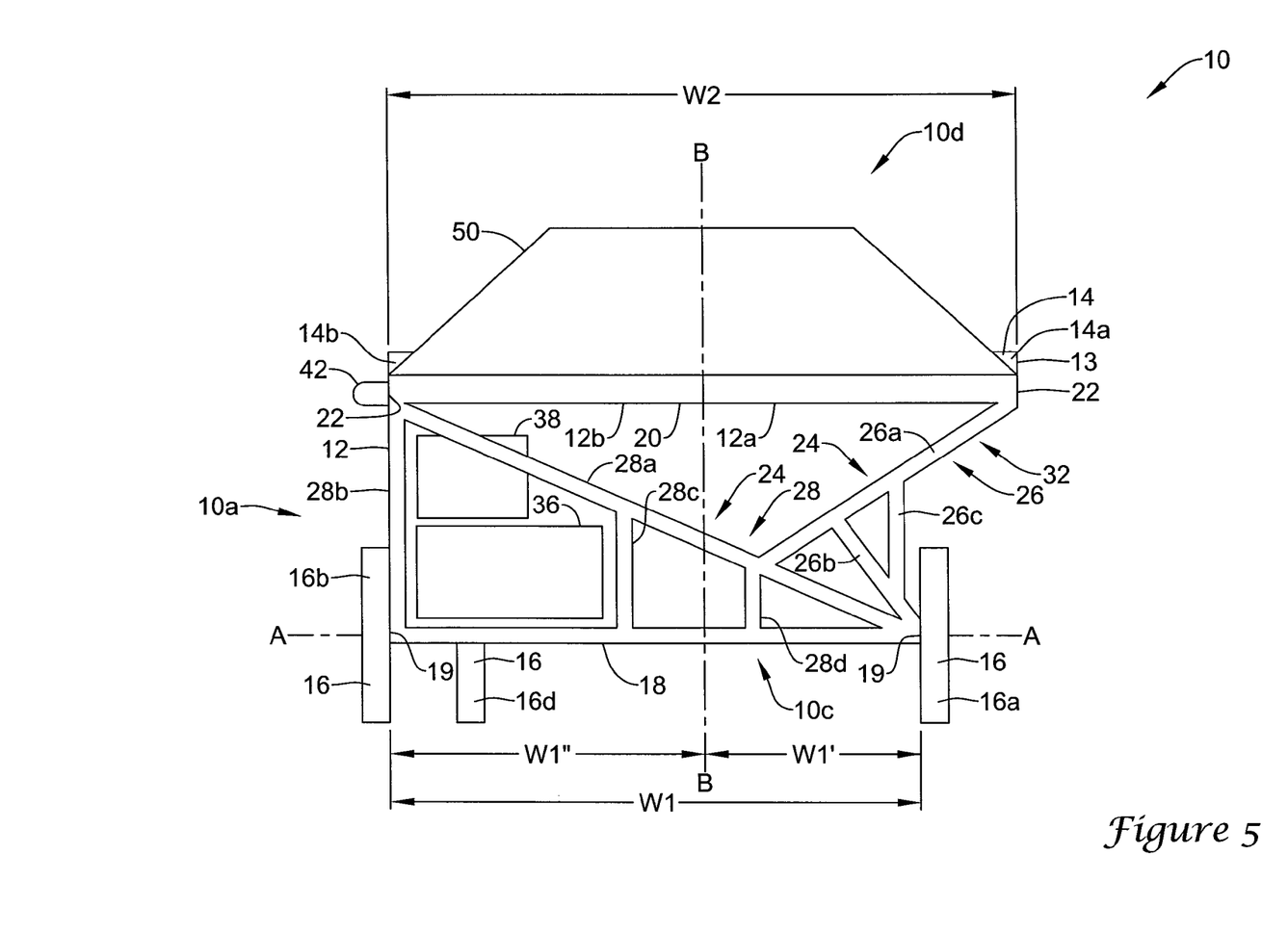
FIG. 5 is a schematic view from the rear side of an illustrative powered wheelchair structure.
Figure 6:
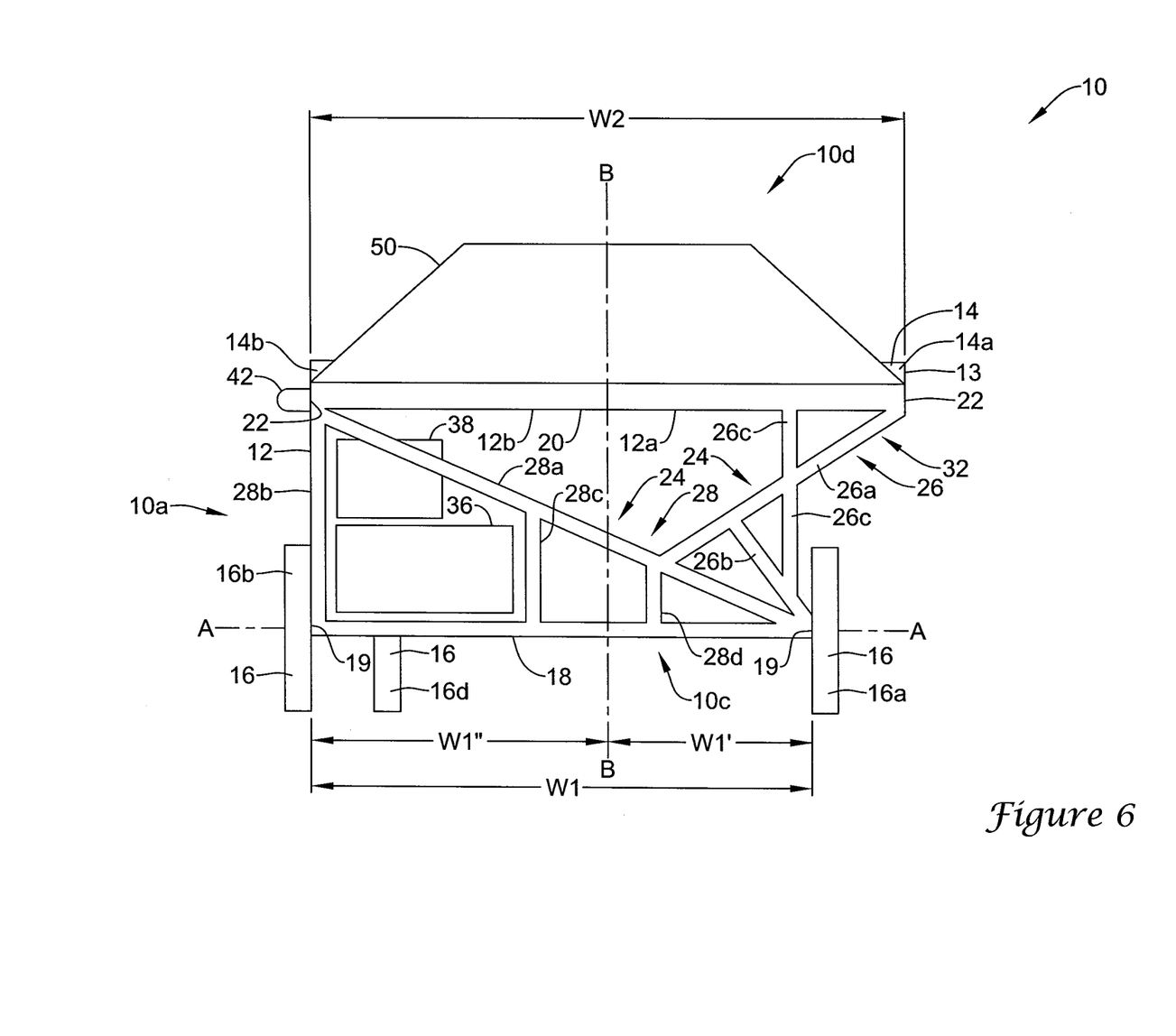
FIG. 6 is a schematic view from the rear side of an illustrative powered wheelchair structure.
Figure 7:
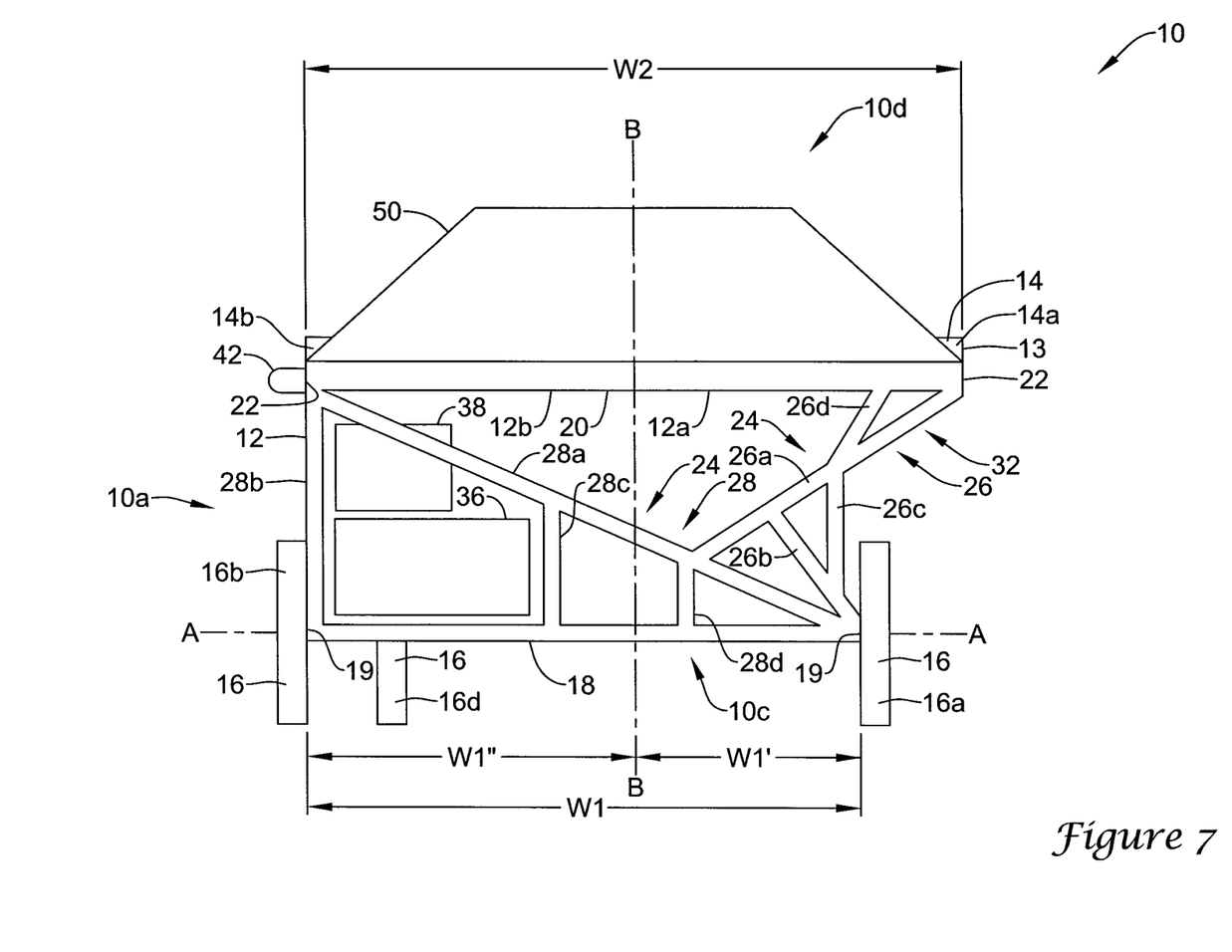
FIG. 7 is a schematic view from the rear side of an illustrative powered wheelchair structure.

In some instances, the first frame support 26 and the second frame support 28 may have any number of portions and may be made up of a single continuous frame support 24 or may comprise two or more frame support 24 portions (e.g., a first portion 26a of the first frame support 26, a second portion 26b of the first frame support 26, a first portion 28a of the second frame support 28, a second portion 28b of the second frame support 28, a third portion 28c of the second frame support 28, and a fourth portion 28d of the second frame support 28, as shown in FIG. 4). The one or more portions of the first frame support 26 and/or the second frame support 28 may take on any of one or more support configurations. For example, the one or more portions of the first frame support 26 and/or the second frame support 28 may include a curved support structure 30 (e.g., the first frame support 26 as shown in FIGS. 3 and 4), a K-frame support structure 32 (e.g., the first frame support as shown in FIGS. 5-7), a slant support structure 34 (e.g., the second frame support 28 as shown in FIGS. 3-7), or any other support structure, as desired.

One or more of the first frame support 26, the second frame support 28, and any other frame support may be configured to facilitate asymmetrically positioning the first wheel 16a and the second wheel 16b with respect to the central plane B-B of the frame 12. For example, one or more portions of the first frame support 26 may extend from a position adjacent the perimeter 22 of the seat support 20 toward a position interior of the footprint of the seat support 20 and then direct toward a perimeter of the footprint of the seat support 20 and toward the perimeter 19 of the wheel support 18, as shown in FIGS. 3-7. In the example, the one or more portions of the first frame support 26 may be configured to at least partially follow a curve (e.g., a curve from a Fibonacci or golden spiral or other curve) and/or have a K-frame structure.

The first frame support 26 may be configured to follow a curve as it traverses from the wheel support 18 to the seat support 20 and form a curve support structure 30, as shown in FIGS. 3 and 4. The curve of the first frame support 26 may follow a portion of a Golden or Fibonacci spiral, for example. Golden and Fibonacci spirals are well known and the dimensions are easily created as the Fibonacci sequence may be used to create the Golden or Fibonacci spiral. It is known that the Fibonacci sequence follows the pattern 0, 1, 1, 2, 3, 5, 8, 13, 21, 34, 65, 99, 164, etc. This sequence may be used to create a Golden or Fibonacci spiral in a dimensionless manner. For example, one may use a compass tool, or other tool, to create a Golden or Fibonacci spiral using the flowing method: 1) draw or form a series of Fibonacci squares with one or more units in length (e.g., a one unit length, where a unit may be any measurement unit); 2) set the compass tool to a number of units (e.g., the number of units making up one side of the square); 3) set the pin end of the compass tool at an inner corner of a square and the marking end of the compass tool at a corner at least partially formed by a line extending from the inner corner of the square; 4) turn the compass ninety degrees; 5) reset the number of units of the compass to the next number in the Fibonacci sequence (e.g., two units or the length in units of the next square in the sequence); 6) place the pin end of the compass tool on an inner corner of a next square in the sequence and the marking end of the compass tool on a corner at least partially formed by a line extending from the inner corner of the next square; 7) connecting with the previously marked curve, rotate the compass ninety degrees to add to the marked curve; 8) repeat steps 5), 6) and 7) until a spiral of a desired size is obtained. Once a Golden or Fibonacci spiral has been formed, a portion of the spiral may be utilized as a portion (e.g., first portion 26a of the first frame support 26) of the curved support structure 30, where the curved portion may extend substantially from the perimeter 22 of the seat support 20 to the perimeter 19 of the wheel support 18. Alternatively, the curved portion may follow any other path and may be formed with any other technique, as desired.

In addition to having a curved first portion 26a that extends substantially the distance from the seat support 20 to the wheel support 18, the first frame support 26 may include one or more other frame support portions. For example, the first frame support 26 may include a second portion 26b. The second portion 26b of the first frame support 26 may be configured to extend from the curved first portion 26a of the first frame support 26 to the second frame support 28 (as shown in FIG. 4), the wheel support 18, the seat support 20, and/or any other feature of the frame 12 or wheelchair 10, as desired.

In some instances, the first frame support 26 may be configured to follow a K-frame support structure 32 as it traverses from the wheel support 18 to the seat support 20, as shown in FIGS. 5-7. The K-frame support structure 32 may generally include two or more portions. For example, in some instances, the K-frame support structure 32 may include a first portion 26a of the frame support 26 configured to extend from the seat support 20 to the second frame support 28, a second portion 26b of the first frame support 26 configured to extend from the first portion 26a of the first frame support 26 to the wheel support 18 (and/or to the first portion 28a of the second frame support), and/or a third portion 26c of the first frame support 26 may extend from the first portion 26a of the first frame support 26 to the second portion 26b of the first frame support 26, as shown in FIG. 5. In some instances, the K-frame support structure 32 may take on any other design, such as extending the second portion 26c of the first frame support 26 to the seat support 20 (see FIG. 6), adding a fourth portion 26d of the first frame support 26 that may extend from the first portion 26a of the first frame support 26 to the seat support 20 (see FIG. 7), redesigning the portions of the first frame support 26 to have support configurations of differing design, and/or adding further portions to the frame support 26, as desired.

The second frame support 28 may include any number of portions. In some illustrative instances, the second frame support 28 may include a first portion 28a that may be configured to extend from the second side 12b of the frame 12 at or near the seat support 20 to the first side 12a of the frame 12 at or near the wheel support 18, a second portion 28b extending from the first portion 28a of the second frame support 28 at a position adjacent or near the seat support 20 to a position adjacent or near the wheel support 18, a third portion 28c and a fourth portion 28d extending from the first portion 28a of the second frame support 28 between where the first portion 28a contacts or abuts the seat support 20 and contacts or abuts the wheel support 18, as shown in FIGS. 3-7. In addition, the portions of the second frame support 28 may take on any other configuration, as desired.

Generally, the frame 12 may be separable from other wheelchair 10 features and may be configured to be used in a variety of wheelchair 10 orientations. For example, the frame 12 may be configured to be used in a wheelchair 10 that may have an orientation for a right-handed user needing to be able to lean toward the right to participate in one or more activities and in a wheelchair 10 that may have an orientation for a left-handed user needing to be able to lean toward the left to participate in activities. Such a configured frame 12, in some cases, may be asymmetric about plane B-B of the wheelchair 10 and symmetric from the rear 10a of the wheelchair 10 to the front 10b of the wheelchair 10 to facilitate being used in the manufacturing of wheelchairs 10 manufactured for left-handed users and wheelchairs 10 manufactured for right-handed users.

In some cases, the wheelchair 10 may be motorized. A motorized wheelchair 10 may include a power generator (e.g., a motor 36) and energy to feed the power generator (e.g., a battery 38, such as a full-size marine battery or other battery 38, as desired). The motor 36 may be any type of motor, such as an electric motor, a gas motor, or other motor typically used on mobility vehicles. The battery 38 may be any type of battery configured to store electricity and may include one or more batteries, as desired. The motor 36 and the battery 38 may be in at least electrical communication with one another and may be in a single housing, separate housings, separable housings, or one or more of the motor 36 and the battery 38 may not include a housing.

The motor 36 and the battery 38 may be supported by the frame 12 of the wheelchair 10. In some instances, one or more of the motor 36 and the battery 38 may be supported by or at or near the wheel support 18, as shown in FIGS. 2-7. For example, the motor 36 and/or the battery 38 may be positioned on the wheel support 18 adjacent the second side 12b of the frame 12 and/or the second wheel 16b. Such positioning of the motor 36 and/or the battery 38 may be configured to facilitate the wheelchair 10 maintaining a center of gravity between the wheels 16 (e.g., between the first wheel 16a and the second wheel 16b) when a user is utilizing the wheelchair 10. For example, the positioning of the motor 36 and the battery 38 toward a second side 12b of the frame 12 and/or the second wheel 16b may facilitate maintaining a center of gravity of a user and/or the wheelchair 10 between the first wheel 16a and second wheel 16b when the user is participating in an activity in which the user may need to lean toward the first side 12a of the frame 12 of the wheelchair 10.

In addition to, or in alternative to, a battery 38 and/or a motor 36 positioned on the second side 12b of the frame 12, the frame 12 may support a weight. In some instances, the weight may act as a ballast and may be positioned so as to facilitate maintaining a center of gravity of a user and wheelchair 10 between the first wheel 16a and the second wheel 16b when the user is participating in an activity in which the user may need to lean toward the first side 12a of the frame 12 of the wheelchair 10. Illustratively, the weight may include one or more of the motor 36, the battery 38, and any other feature having a mass and configured as a ballast to facilitate maintaining a center of gravity of a user and the wheelchair 10 between the first wheel 16a and the second wheel 16b.

As discussed, in some instances the seat support 20 may support a seat 14 substantially within or about the perimeter 22 of the seat support 20, wherein the seat 14 may have a first side 14a and second side 14b opposite the first side 14a of the seat 14. The first side 14a of the seat 14 may be positioned adjacent the first side 12a of the frame 12 and the second side 14b of the seat 14 may be positioned adjacent the second side 12b of the frame 12. In some illustrative instances, the seat 14 may have a central axis extending therethrough that separates the first side 14a of the seat 14 from the second side 14b of the seat 14. The central axis of the seat 14 may, in some cases, be aligned with the central axis of the frame 12 and form central plane B-B of the wheelchair 10.

The seat 14 may have any number of portions spanning the first side 14a and the second side 14b of the seat 14. In some instances, the seat 14 may have one or more seat portions. For example, the seat 14 may have a single portion configured for a single person (as shown in FIGS. 1-7), a single portion configured for multiple people, multiple portions configured for a single person, multiple portions configured for multiple people, and/or any other set of portions configured for any other number of people. Illustratively, the seat 14 may have one portion for first side 14a of the seat 14 and a separate one portion for the second side 14b of the seat 14. Alternatively, or in addition, the first side 14a of the seat 14 may have multiple portions and/or the second side 14b of the seat 14 may have multiple portions.

Illustratively, a perimeter 13 of the seat 14 may include one or more cut-in areas 15 on one or more of the first side 14a of the seat 14 and the second side 14b of the seat 14, wherein the cut-in area 15 of the seat 14 may follow a contour of the seat support 18. In some cases, the perimeter 13 of the seat 14 may include two cut-in areas 15 on one or more of the first side 14a of the seat 14 and the second side 14b of the seat 14 to facilitate a symmetric configuration of the frame 12 from the rear 10a of the wheelchair 10 to the front 10b of the wheelchair 10.

Where the perimeter 13 of the seat 14 includes a cut-in area 15 on the first side 14a of the seat 14 near the first side 12a of the frame 12 and the motor 36 and the battery 38 may be supported primarily by the second side 12b of the frame 12, as shown in FIG. 1, the wheelchair 10 and/or a user seated in the wheelchair 10 may maintain a center of balance between the first wheel 16a and the second wheel 16b while the user may be participating in an activity requiring movement about the first side of the wheelchair 10 (e.g., bowling, fencing, trimming a garden, tossing a ball underhand, dribbling a basketball, swinging a racquet or club, participating in a track and field event, etc.). In some cases, the center of balance of the wheelchair 10 may be offset from the central plane B-B of the wheelchair 10, but positioned substantially within a perimeter of the frame and/or between the first wheel 16a and the second wheel 16b. In some illustrative instances, the seat 14 may be configured to support and/or receive a user that spans from the first side 14a of the seat 14 to the second side 14b of the seat 14 and the cut-in area 15 may be configured to facilitate a release of a bowling ball or other object by the user and a follow through after the release of the bowling ball or other object by the supported and/or received user while the user and the wheelchair 10 maintain a center of gravity or balance between the first wheel 16a and the second wheel 16b.

In some instances, the wheelchair 10 may include one or more leg braces 40, where the leg brace(s) 40 may be configured to support one or more legs of a user to assist in preventing the one or more legs from falling off of the seat 14. Illustratively, the leg brace(s) 40 may be positioned adjacent the cut-in area 15 of the seat 14, such that the leg brace(s) 40 may support a user's leg as the user is leaning toward the first side 14a of the seat 14. In some cases, the leg brace 40 may be removable from the wheelchair 10 when it is not needed or desired.

The side of the wheelchair 10 including the first side 14a of the seat 14, and optionally including one or more cut-in areas 15, may be substantially open, which may allow for a full and/or unencumbered range of motion for a user's arm while the user is participating in an activity (e.g., bowling, fencing, trimming a garden, tossing a ball underhand, dribbling a basketball, swinging a racquet or club, participating in a track and field event, etc.). Such a side of the wheelchair 10 may be considered a performance side of the wheelchair 10 and may facilitate using the wheelchair 10 in one or more activities.

In some illustrative instances, the performance side of the wheelchair 10 may include one or more features that facilitate, but do not hinder or encumber, a full range of motion of a user's arm when the user is participating in an activity. For example, the performance side of the wheelchair 10 may include one or more leg brace 40 and/or other objects configured to support a user while the user is participating in an activity and at least partially using a full range of motion of their arm.

The wheelchair 10 may include one or more handles 42, where the handle 42 may be configured to, among other things, support the grasp of a user's hand to assist in preventing the user from falling from the wheelchair 10 and/or to assist a user in entering and/or exiting the wheelchair 10. Illustratively, at least one of the one or more handles 42 may be in communication with the second side 14b of the seat 14 and or the second side 12b of the frame 12. The handle 42 may be used, for example, as a support that a user may grasp or be tied to for support as the user participates in an activity (e.g., bowling, fencing, trimming a garden, tossing a ball underhand, dribbling a basketball, throwing a discuss, participating in other track and field events, playing tennis, playing golf, etc.) that involves leaning toward the first side 14a of the seat 14 and/or the first side 12a of the frame 12. In some cases, the handle 42 may be removable from the wheelchair 10 when it is not needed or desired.

Generally, the wheelchair 10 may be manufactured for right-handed users and/or left-handed users. Further, the wheelchair 10 may be manufactured for use in any of one or more activities (e.g., bowling, fencing, track and field, softball, gardening, tennis, basketball, etc.). Illustratively, the frame 12 of the wheelchair 10 may facilitate meeting manufacturing specifications for such users and activities by being asymmetrically configured about plane B-B of the wheelchair 10 and symmetrically configured from the rear 10a of the wheelchair 10 to the front 10b of the wheelchair 10 and/or may facilitate such manufacturing specifications for such activities by having other similar or dissimilar characteristics.

The configuration of the wheelchair 10 may take on numerous other embodiments while staying within the spirit of this disclosure. For example, the wheelchair 10 may have any number of wheels 16 (e.g., three wheels 16 with one wheel 16 in back or in front and two wheels 16 in the other of the back or front), one or more accessories, and/or any design specification, as desired. Illustratively, one or more optional accessories may be used with the wheelchair 10 in addition or as an alternative to the accessories discussed, some of which may be shown in FIG. 1. For example, the wheelchair 10 may include one or more footrests 44, one or more joystick controllers 46 or other controller(s), one or more removable or non-removable ball racks 48 (e.g., a removable ball rack configured to engage rack connectors 52 and to support two bowling balls in bowling ball supports 54, as shown in FIG. 1), a back support 50, one or more removable back support cover panels, one or more trays, one or more handles (e.g., in addition or in alternative to handle 42), and/or other similar or dissimilar accessories that do not hinder a full range of motion of a user's arm on the performance side of the wheelchair 10, as desired. In some instances, the accessories and/or other features of the wheelchair 10 may be connected to one another in any manner. For example, the accessories and/or other features may connect to one another through a weld connection, a threaded connection, a ball-detent connection, a hook and loop connection, a pressure-fit connection, or through any other separable or non-separable connection mechanism.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A motorized vehicle assembly, comprising:
   a seat;
   a frame in communication with the seat, the frame having a central vertical plane extending therethrough and including:
      a frame support; and
      a seat support immovably mounted to the frame support, wherein:
         the seat support is configured to support the seat and has a perimeter;
         at least one of one or more frame supports of the frame extends from a position adjacent the perimeter of the seat support toward a position interior of a footprint of the perimeter of the seat support and re-directs toward the footprint of the perimeter of the seat support and toward a perimeter of a wheel support; and
         at least one of the one or more frame supports of the frame is configured in a K-Frame structure; and
   a first wheel in communication with the frame and configured to rotate relative to the frame and about a wheel axis; and
   a second wheel in communication with the frame and configured to rotate relative to the frame and about the wheel axis; and
   wherein the first wheel and the second wheel are positioned asymmetrically with respect to the central vertical plane of the frame.

2. The assembly of claim 1, wherein the frame is asymmetrical with respect to the central vertical plane.

3. The assembly of claim 1, wherein the first wheel is positioned interior of the footprint of the perimeter of the seat support and the second wheel is positioned exterior the footprint of the perimeter of the seat support.

4. The assembly of claim 1, further comprising:
   a motor; and
   a battery configured to power the motor; and
   wherein one or more of the motor and the battery are positioned adjacent the second wheel.

5. The assembly of claim 1, wherein:
   the seat has a first side and a second side opposite the first side; and
   a perimeter of the seat has a cut-in portion on the first side; and
   wherein the seat is configured to support a user that spans from the first side of the seat to the second side the seat and the cut-in is configured to facilitate a release of an object by the received user and a follow through after the release of the object by the received user.

6. The assembly of claim 5, further comprising:
   a leg brace in communication with the cut-in portion of the seat.

7. The assembly of claim 1, wherein:
   the motorized vehicle assembly is configured to allow a user to bowl while seated in the wheelchair; and
   the frame is configured to be used in a vehicle configured for a left-handed bowler and a vehicle configured for a right handed bowler.

8. The assembly of claim 1, wherein the seat is situated substantially entirely within a perimeter of the seat support.

9. The assembly of claim 1, wherein the seat is immovably mounted to the frame.

10. A motorized wheelchair assembly, comprising:
   a seat having a first side and a second side and a central axis separating the first side of the seat from the second side of the seat;
   a frame having a seat support configured to support the seat, where the frame has a first side adjacent the first side of the seat, a second side adjacent the second side of the seat, and a central axis separating the first side of the frame from the second side of the frame, where the central axis of the frame and the central axis of the seat form a central vertical plane;
   a first wheel configured to rotate about an axis;
   a second wheel configured to rotate about the axis;
   a weight supported by the second side of the frame and at least partially offset from the central vertical plane; and
   wherein the first side of the seat extends from the central vertical plane and over the first wheel; and wherein the first side of the seat includes a cut-in portion configured to facilitate an under arm throwing motion of a user positioned on the seat.

11. The assembly of claim 10, wherein the weight comprises one or more of a motor and a battery configured to power the motor.

12. The assembly of claim 10, wherein the first wheel is supported by the first side of the frame and is positioned interior a footprint at least partially defined by a perimeter of the seat support.

13. The assembly of claim 12, wherein the second wheel is supported by the second side of the frame and is positioned exterior the footprint at least partially defined by the perimeter of the seat.

14. The assembly of claim 10, wherein a center of balance of the wheelchair assembly is offset from the central vertical plane.

15. A motorized vehicle assembly, comprising:
a seat;
a frame in communication with the seat, the frame having a central vertical plane extending therethrough and including:
a frame support; and
a seat support immovably mounted to the frame support, wherein:
the seat support is configured to support the seat and has a perimeter;
at least one of one or more frame supports of the frame extends from a position adjacent the perimeter of the seat support toward a position interior of a footprint of the seat support and re-directs toward a perimeter of the footprint of the seat support and toward a perimeter of a wheel support; and
at least one of the one or more frame supports is configured to follow a curve of a Fibonacci spiral; and
a first wheel in communication with the frame and configured to rotate relative to the frame and about a wheel axis; and
a second wheel in communication with the frame and configured to rotate relative to the frame and about the wheel axis; and
wherein the first wheel and the second wheel are positioned asymmetrically with respect to the central vertical plane of the frame.

* * * * *